United States Patent
Takagi et al.

(10) Patent No.: US 6,940,696 B2
(45) Date of Patent: Sep. 6, 2005

(54) HEAD SUSPENSION FOR DISK DRIVE HAVING A CONTACT FACE TO RECEIVE JIG

(75) Inventors: Yasuji Takagi, Yokohama (JP); Noriyuki Saitoh, Yokohama (JP); Akira Nojima, Yokohama (JP); Hideki Fuchino, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 238 days.

(21) Appl. No.: 10/334,524

(22) Filed: Dec. 31, 2002

(65) Prior Publication Data

US 2003/0128472 A1 Jul. 10, 2003

(30) Foreign Application Priority Data

Jan. 7, 2002 (JP) ........................................ 2002-000419

(51) Int. Cl.$^7$ ............................................. G11B 21/21
(52) U.S. Cl. .................................................. 360/244.6
(58) Field of Search ............................ 360/244.5, 244.6

(56) References Cited

U.S. PATENT DOCUMENTS

| | | | |
|---|---|---|---|
| 4,167,765 A | | 9/1979 | Watrous .................... 360/104 |
| 5,153,794 A | * | 10/1992 | Hinlein .................... 360/244.6 |
| 5,602,698 A | | 2/1997 | Miyazaki et al. ......... 360/244.6 |
| 5,717,545 A | * | 2/1998 | Brooks et al. ........... 360/244.6 |
| 5,949,615 A | * | 9/1999 | Hernandez ............... 360/244.5 |
| 6,046,885 A | * | 4/2000 | Aimonetti et al. ....... 360/244.6 |
| 6,442,001 B1 | * | 8/2002 | Coon et al. .............. 360/266.1 |
| 6,597,538 B1 | * | 7/2003 | Kashima et al. ......... 360/244.5 |
| 6,697,227 B2 | * | 2/2004 | Kashima et al. ......... 360/245.2 |

FOREIGN PATENT DOCUMENTS

JP 2001-176224 6/2001

* cited by examiner

*Primary Examiner*—Brian E. Miller
(74) *Attorney, Agent, or Firm*—Jordon and Hamburg LLP (57) ABSTRACT

A head suspension for a disk drive includes a plate that is easily and correctly be attached to a carriage of the disk drive and improves the attaching accuracy and strength of the head suspension to the carriage. The head suspension includes the plate and a load beam. The plate has a boss that is formed separately from the plate. The boss has a base fixed to the plate and a protrusion fitted into a hole of a carriage arm of the carriage. The plate has a through hole. The base of the boss is fitted into the through hole and is fixed to the plate. Under this state, the protrusion of the boss protrudes from a first face of the plate, and the base of the boss protrudes from a second face of the plate. An end face of the base of the boss serves as a contact face for jig.

16 Claims, 12 Drawing Sheets

HEAD SUSPENSION FOR DISK DRIVE HAVING A CONTACT FACE TO RECEIVE JIG

BACKGROUND OF THE INVENTION

1. Field of the Invention

The present invention relates to a head suspension for a disk drive incorporated in an information processing apparatus such as a personal computer.

2. Description of the Related Art

A hard disk drive (HDD) records and reproduces information to and from rotating magnetic or magneto-optical disks. The HDD has a carriage turned around a spindle by a positioning motor.

An example of the carriage is disclosed in U.S. Pat. No. 4,167,765. The carriage of this disclosure includes carriage arms, a head suspension attached to a front end of each carriage arm, a head attached to the head suspension, and a slider attached to the head. When the disks are rotated at high speed, the sliders slightly float from the disks, and air bearings are formed between the disks and the sliders.

The head suspension includes a load beam made of a precision thin plate spring, a flexure made of a very thin plate spring fixed to a front part of the load beam by, for example, laser welding, and a plate fixed to a base of the load beam by, for example, laser welding. The plate is fixed to a head suspension fitting face of the carriage arm.

Figure 21:
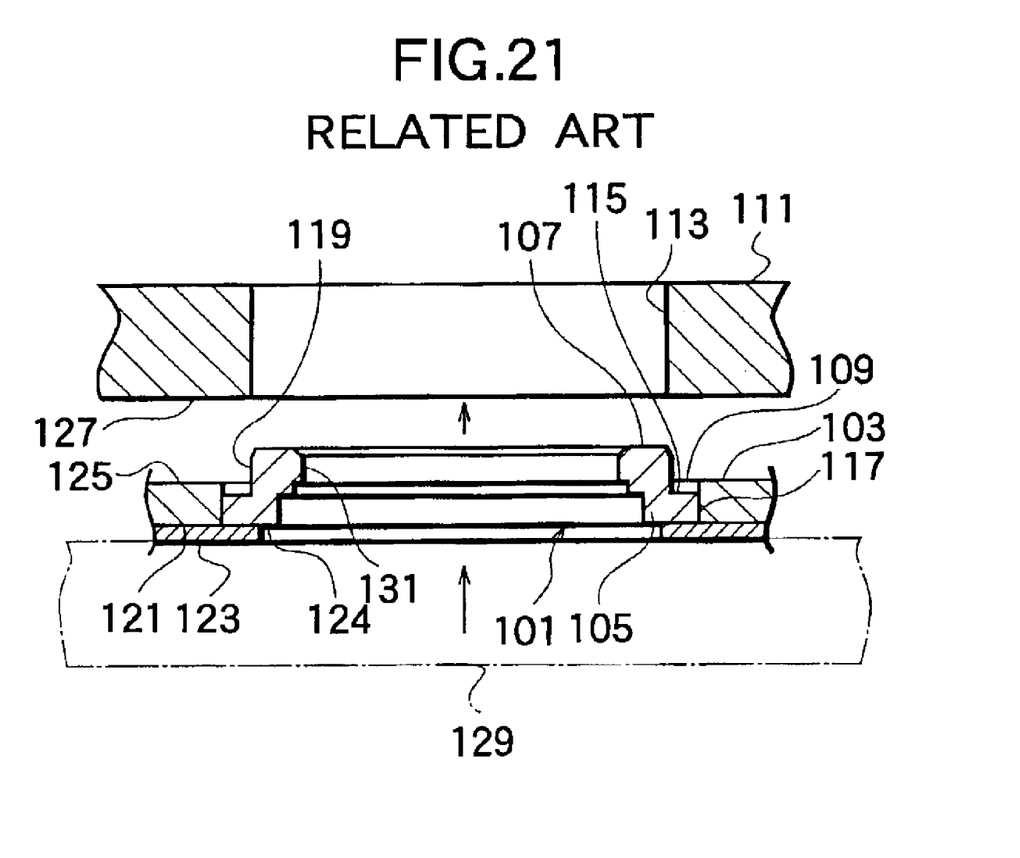
FIG. 21 is an enlarged sectional view showing a part of a head suspension to be attached to a carriage arm, according to a related art.

FIG. 21 shows a structure to fix a head suspension to a carriage arm according to a related art disclosed in Japanese Patent Laid Open Publication No. 2001-176224. A boss 101 is formed separately from a plate 103. The boss 101 may have a flange and a protrusion. The plate 103 is a base to be attached to the carriage arm 111.

In FIG. 21, the boss 101 has a base 105 and a protrusion 107. The base 105 is arranged in a through hole 109 formed in the plate 103. The base 105 has a support periphery 115. The support periphery 115 has a support face 117 that fits in the through hole 109 of the plate 103. The boss 101 is fixed to the plate 103 by, for example, laser welding. An end face 124 of the boss 101 is substantially flush with a second face 121 of the plate 103. The protrusion 107 is fitted into a hole 113 of the carriage arm 111. The protrusion 107 has a fitting periphery 119. On the second face 121 of the plate 103, a base of a resilient material 123 is fixed by, for example, laser welding.

To attach the plate 103 to the carriage arm 111, a first face 125 of the plate 103 is adjusted to a surface 127 of the carriage arm 111, and the protrusion 107 of the boss 101 is fitted into the hole 113 of the carriage arm 111.

A jig 129 is set on the base 105 of the boss 101, to hold the boss 101 against the carriage arm 111. From the direction of an arrow mark, a steel ball is passed through a hole 131 of the boss 101, to expand the hole 131 and plastically deform the protrusion 107. As a result, the fitting periphery 119 of the boss 101 is pressed to the hole 113 of the carriage arm 111, and the plate 103 is fixed to the carriage arm 111 through the boss 101.

The boss 101 must have a proper softness for the above-mentioned plastic deformation. The plate 103 must have proper flatness and high hardness so that it may precisely and strongly be fixed to the carriage arm 111.

To reduce weight, the thinner the plate 103, the better. For example, the plate 103 is thinned to 150 μm from a conventional thickness of 300 μm. If the boss 101 and plate 103 must be in one body, they will be formed by pressing a plate material into respective thicknesses. Forming the plate 103 by pressing, however, deteriorates the flatness thereof. Employing a thin plate material to form the plate 103 having a thickness of, for example, 150 μm makes the thickness of the boss 101 insufficient.

To cope with this problem, the boss 101 and plate 103 of FIG. 21 are formed separately from each other. The boss 101 is made of metal softer than metal for the plate 103, so that the boss 101 may easily be deformed and fixed to the carriage arm 111. The plate 103 formed independently of the boss 101 needs no pressing to adjust the thickness thereof, thereby securing flatness. The plate 103 may be made of hard metal, to improve the attaching accuracy and strength of the plate 103 to the carriage arm 111. The boss 101 may have an optional shape without regard to the thickness of the plate 103. The plate 103 may be made thinner to further reduce the total weight of the head suspension.

The structure mentioned above, however, has some problems. The end face 124 of the boss 101 is flush with the second face 121 of the plate 103, and therefore, reaction force from the jig 129 is also applied to the plate 103, to make the support of the boss 101 by the jig 129 insufficient. When a steel ball is passed through the hole 131 to deform the protrusion 107, the boss 101 may incline relative to the carriage arm 111.

If the fitting periphery 119 of the boss 101 is pressed to the hole 113 of the carriage arm 111 with the boss 101 inclining relative to the carriage arm 111, the plate 103 fixed to the carriage arm 111 will be oblique relative to the carriage arm 111. This results in deteriorating the attaching accuracy of the plate 103 to the carriage arm 111, the positioning accuracy of a slider on a disk, and the vibration characteristics of the head suspension.

The inaccurate connection of the boss 101 to the hole 113 of the carriage arm 111 also decreases the attaching strength of the boss 101 to the carriage arm 111.

SUMMARY OF THE INVENTION

An object of the present invention is to provide a head suspension for a disk drive, capable of improving the attaching accuracy and strength of a plate of the head suspension to a carriage arm of the disk drive.

A first aspect of the present invention provides a head suspension for a disk drive, including a plate to be attached to a carriage of the disk drive by inserting a boss of the plate into a hole of the carriage and plastically deforming the inserted boss and a load beam having a rigid part and a resilient part and supported by the plate, to apply load on a slider arranged at a front end of the load beam. The boss is formed separately from the plate and has a base fixed to the plate and a protrusion to be inserted into the hole of the carriage. The plate has a through hole to hold the boss. The boss is arranged in the through hole of the plate with the base of the boss fixed to the plate, the protrusion of the boss protruding from a first face of the plate, the base of the boss protruding from a second face of the plate, an end face of the base of the boss serving as a contact face to receive a jig.

For the head suspension of the first aspect, a second aspect of the present invention provides the base of the boss with a support periphery along the circumference of the base, the support periphery being inserted into the through hole of the plate to fix the boss to the plate.

For the head suspension of the first aspect, a third aspect of the present invention provides the base of the boss with a flange along the circumference of the base. Also, the third aspect provides the plate with a recess along the periphery of the through hole of the plate. The recess is open to the second face of the plate and receives the flange when fixing the boss to the plate.

For the head suspension of the first aspect, a fourth aspect of the present invention provides the base of the boss with a flange along the circumference of the base, the flange being attached to the second face of the plate to fix the boss to the plate.

For the head suspension of any one of the first to fourth aspects, a fifth aspect of the present invention forms the rigid part and resilient part of the load beam separately from each other, joins a first end of the resilient part to the rigid part and a second end of the resilient part to the plate.

For the head suspension of any one of the first to fifth aspects, a sixth aspect of the present invention further employs a displacement part to displace the front end of the load beam relative to the plate independently of a displacement achieved by the carriage and an actuator element to actuate the displacement part.

The first aspect attaches the plate of the head suspension to a carriage of a disk drive by inserting the boss of the plate into a hole of the carriage and plastically deforming the inserted boss. The load beam having the rigid part and resilient part and supported by the plate applies load on the slider arranged at the front end of the load beam.

The boss is formed separately from the plate and has the base fixed to the plate and the protrusion to be inserted into the hole of the carriage. The plate has a through hole to support the boss. The boss is arranged in the through hole of the plate with the base of the boss fixed to the plate, the protrusion of the boss protruding from the first face of the plate, the base of the boss protruding from the second face of the plate, an end face of the base of the boss serving as a contact face to receive a jig. When the protrusion of the boss is fitted into the hole of the carriage, reaction force from the jig is wholly applied to the contact face of the boss protruding from the second face of the plate.

The first aspect correctly holds the boss in the hole of the carriage, improves the attaching accuracy of the plate to the carriage, and correctly attaches the boss to the carriage. This results in improving the positioning accuracy of the slider on a disk and maintaining specified vibration characteristics. The first aspect correctly fits the boss into the hole of the carriage, thereby improving the attaching strength of the plate to the carriage.

The boss is separate from the plate. Accordingly, the rigidity of the boss may be lowered than that of the plate, so that the boss may easily be deformed and attached to the carriage.

There is no need of pressing and adjusting the thickness of the plate. As a result, the plate can maintain high flatness. The plate may be made of hard metal to improve the hardness thereof. This results in improving the attaching accuracy and strength of the plate to the carriage. The boss may have an optional shape without regard to the thickness of the plate, and the plate can be more thinned to reduce the total weight of the head suspension.

In addition to the effects of the first aspect, the second aspect provides the base of the boss with a support periphery along the circumference of the base, the support periphery being inserted into the through hole of the plate to fix the boss to the plate. The second aspect surely applies reaction force from a jig only to the boss when the boss is deformed to fix the plate to the carriage. This results in improving the attaching accuracy and strength of the plate to the carriage.

When the support periphery of the boss is inserted into the through hole of the plate, the boss is correctly positioned relative to the plate, so that the boss is correctly and easily fixed to the plate.

In addition to the effects of the first aspect, the third aspect provides the base of the boss with a flange along the circumference of the base. Also, the third aspect provides the plate with a recess along the periphery of the through hole of the plate. The recess is open to the second face of the plate and receives the flange when fixing the boss to the plate. Fitting the flange into the recess of the plate suppresses the total thickness of the head suspension.

In addition to the effects of the first aspect, the fourth aspect provides the base of the boss with a flange along the circumference of the base and attaches the flange to the second face of the plate to fix the boss to the plate. The fourth aspect is effective to easily fix the boss to the plate through the flange.

In addition to the effects of the first to fourth aspects, the fifth aspect forms the rigid part and resilient part of the load beam separately from each other and joins a first end of the resilient part to the rigid part and a second end of the resilient part to the plate. The material and thickness of the rigid part are free from those of the resilient part, and therefore, they may optionally be chosen to provide performance required for the head suspension. For example, the rigid part may be made of a thick plate material to provide high rigidity and low air resistance without forming curved edges or ribs by bending. This results in preventing air disturbance and fluttering during the high-speed rotation of disks.

In addition to the effects of the first to fifth aspects, the sixth aspect employs the displacement part to displace the front end of the load beam relative to the plate independently of a displacement achieved by the carriage and the actuator element to actuate the displacement part. The sixth aspect improves the positioning accuracy of the slider. The actuator element is lighter than an actuator system including a voice coil motor for driving the carriage, and therefore, is capable of controlling the slider in high frequency bands. As a result, a servo band width for slider positioning control of the actuator element can be several times higher than that of the voice coil motor for driving the carriage, thereby reducing tracking errors.

DETAILED DESCRIPTION OF EMBODIMENTS (First Embodiment)

Figure 1:
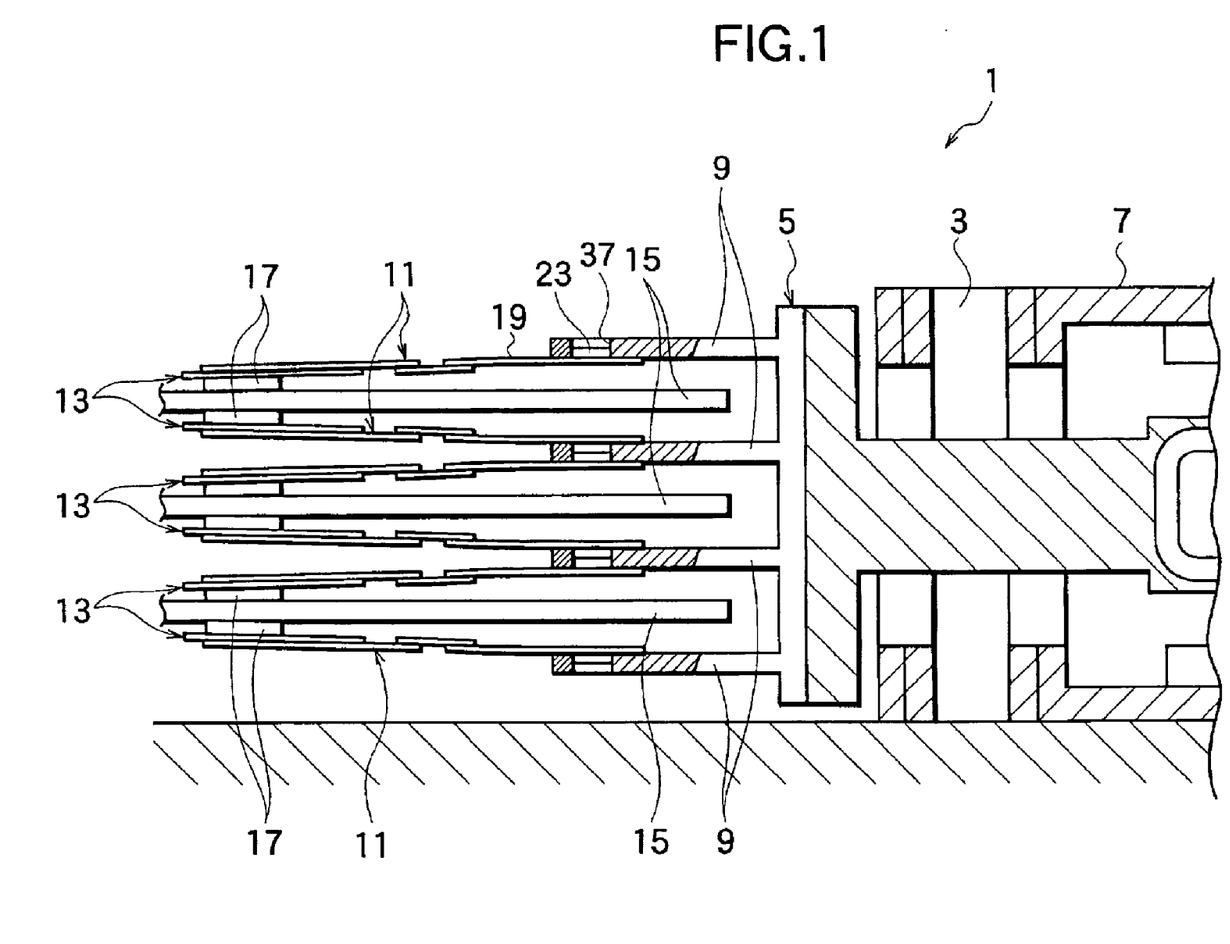
FIG. 1 is a sectional view partly showing a hard disk drive employing head suspensions according to a first embodiment of the present invention.

FIG. 1 is a sectional view partly showing a hard disk drive employing head suspensions according to the first embodiment of the present invention. The hard disk drive 1 has a carriage 5 rotatable around a spindle 3.

The carriage 5 is driven around the spindle 3 by a positioning motor 7 such as a voice coil motor. The carriage 5 has a plurality (four in FIG. 1) of carriage arms 9. Each carriage arm 9 has the head suspension 11 of the first embodiment at a front end thereof. A front end of the head suspension 11 has a head 13.

The carriage 5 is turned around the spindle 3, to move each head 13 to a target track on a disk 15. The head 13 includes a slider 17 facing tracks on the disk 15 and a transducer (not shown) supported by the slider 17. When the disks 15 are rotated at high speed, air enters between the disks 15 and the sliders 17 to slightly float the sliders 17 from the disks 15 and form air bearings between the disks 15 and the sliders 17.

Figure 2:
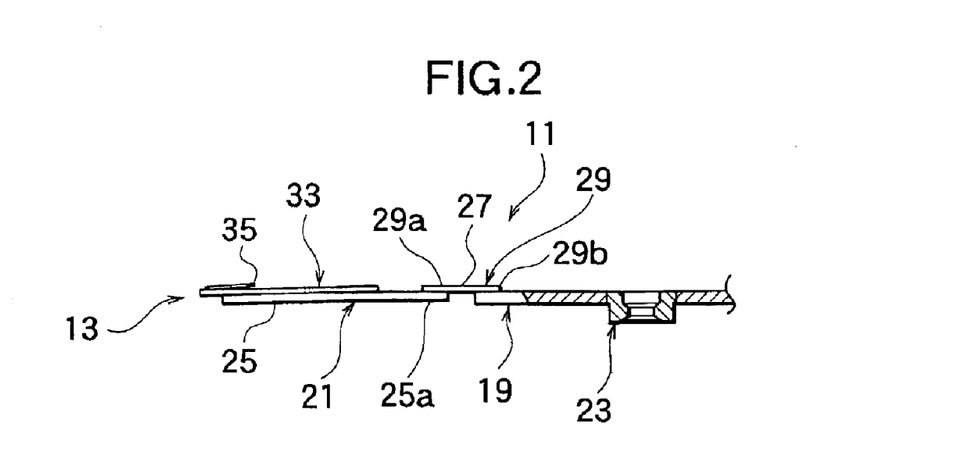
FIG. 2 is a partly broken side view showing the head suspension of the first embodiment.
Figure 3:
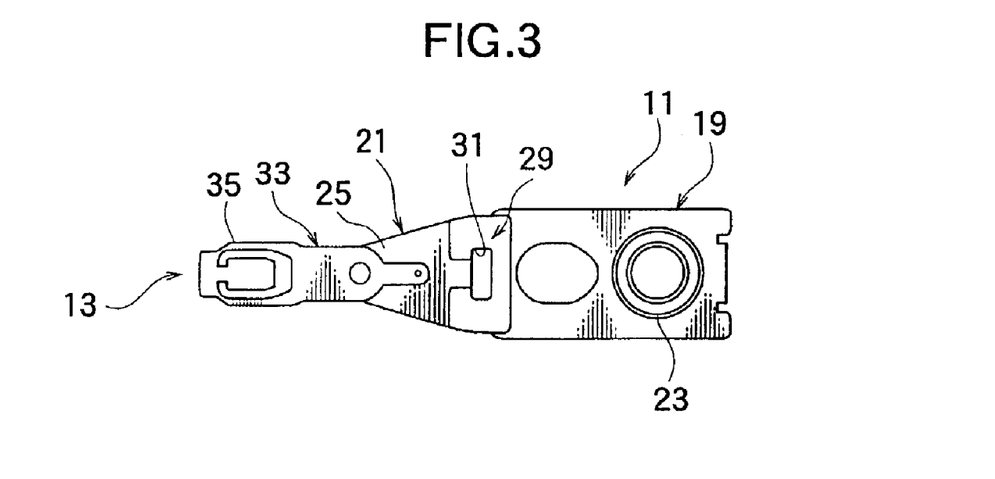
FIG. 3 is a plan view showing the head suspension of the first embodiment.
Figure 4:
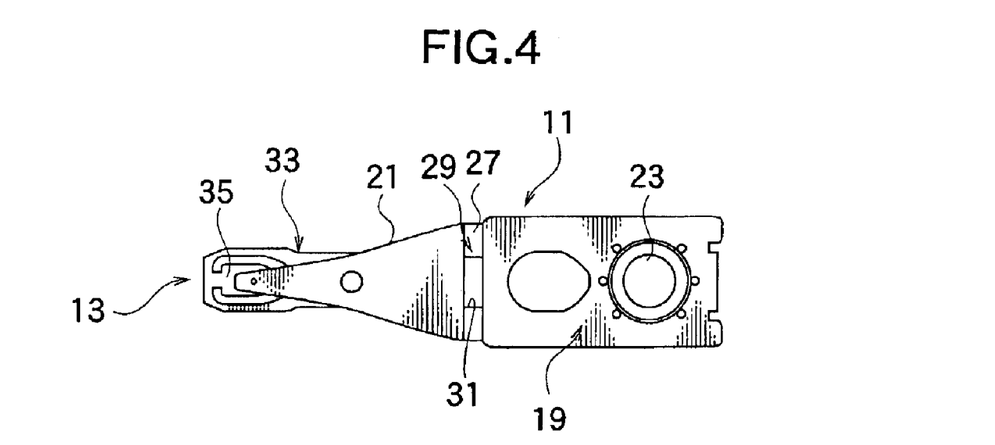
FIG. 4 is a bottom view showing the head suspension of the first embodiment.

FIG. 2 is a partly broken side view showing the head suspension 11, FIG. 3 is a plan view showing the same, and FIG. 4 is a bottom view showing the same. The head suspension 11 has a plate 19 and a load beam 21.

The plate 19 is made of, for example, a stainless steel plate and is attached to the carriage arm 9 of the carriage 5 (FIG. 1). According to the first embodiment, the thickness of the plate 19 is 200 ì m and is formed without mechanical processing such as pressing. The plate 19 has a boss 23 that is separately formed from the plate 19 and is fixed to the plate 19. For easy fitting by plastic deformation, the boss 23 is made of metal softer than the metal of the plate 19. The plate 19 is made of a hard thin metal plate to secure flatness, attaching accuracy, and attaching strength. For example, the boss 23 has a Vickers hardness (Hv) of 180 and the plate 19 has Hv of 300 to 350.

The load beam 21 applies load on the slider 17 arranged at a front end thereof. The load beam 21 includes a rigid part 25 and a resilient part 27. The resilient part 27 is made of a resilient material 29 that is independent of the rigid part 25.

The rigid part 25 is made of, for example, stainless steel. The rigid part 25 may be made of an alloy of light metal (metal lighter than Fe) such as aluminum (Al) and titanium (Ti), or synthetic resin, to simultaneously realize lightness and rigidity for the head suspension 11. The rigid part 25 may be made of a composite material (clad material) consisting of two or more layers of light metal such as aluminum and titanium or an alloy of the light metal and other metal such as stainless steel.

The resilient material 29 is substantially rectangular and extends from the plate 19 to the rigid part 25. The resilient material 29 is made of, for example, resilient thin stainless steel and has a precision low spring constant lower than that of the rigid part 25.

The resilient material 29 has an opening 31 made by, for example, etching or precision pressing. The opening 31 partly reduces the bending rigidity (spring constant) of the resilient material 29 and forms the resilient part 27 serving as a hinge between the plate 19 and the rigid part 25. A first side 29a of the resilient material 29 is laid on an end 25a of the rigid part 25 and is fixed thereto by, for example, welding (such as laser welding) or bonding. A second side 29b of the resilient material 29 is laid on and fixed to an end of the plate 19 by, for example, welding (such as laser welding) or bonding.

A flexure 33 is attached to the rigid part 25 by, for example, welding (such as laser welding) or bonding. The flexure 33 consists of a metal base made of, for example, a resilient thin stainless steel rolled plate, an electric insulating layer formed on the metal base, and a conductive path formed in the insulating layer. An end of the conductive path is connected to a terminal arranged at the head 13, and the other end thereof to a signal output terminal. The flexure 33 has a tongue 35 to which the slider 17 (FIG. 1) is attached.

Figure 5:
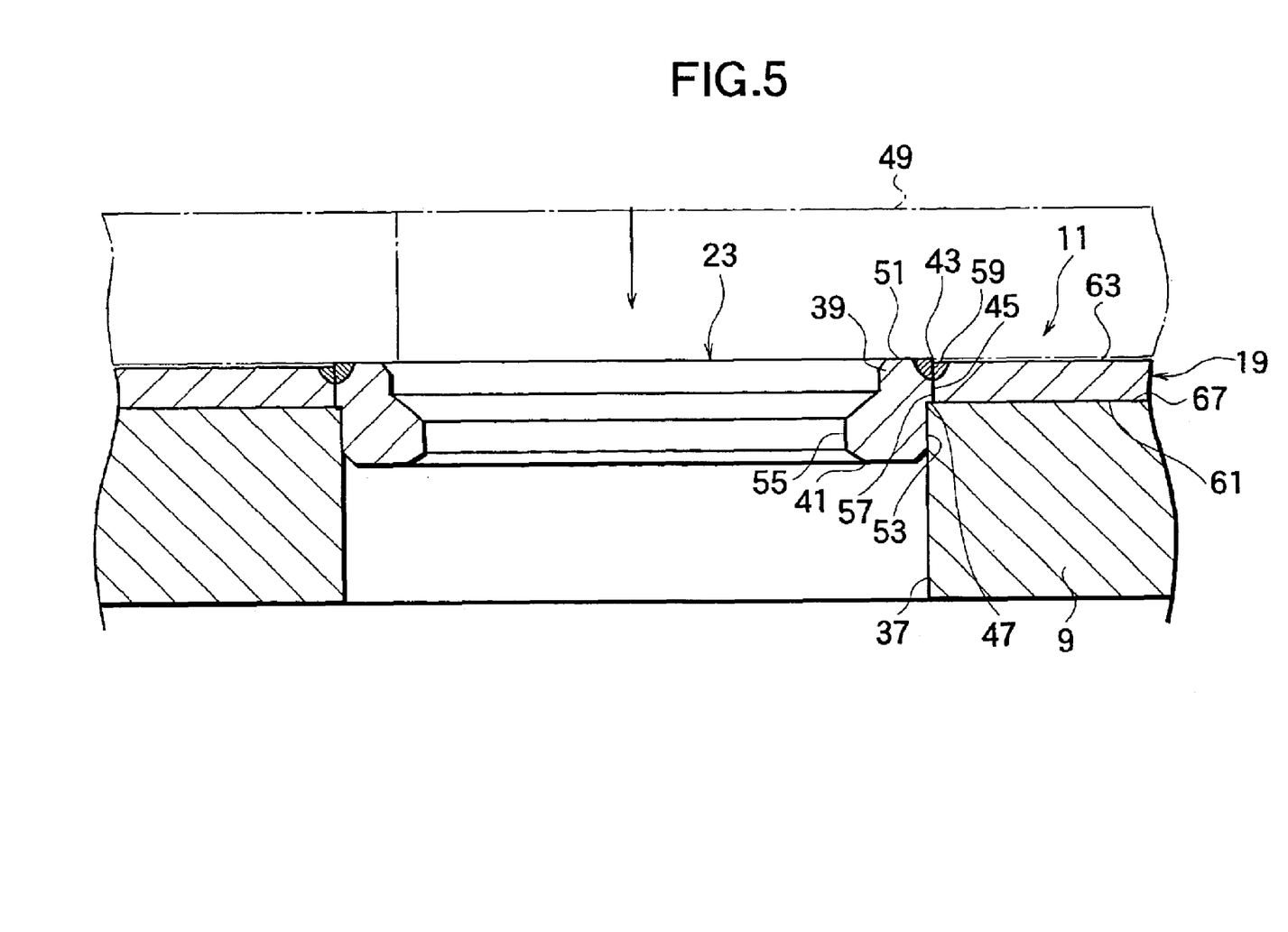
FIG. 5 is an enlarged sectional view showing a part of the head suspension of the first embodiment to be attached to a carriage arm.

FIG. 5 is an enlarged sectional view showing a part of the head suspension 11 to be attached to the carriage arm 9. The plate 19 is attached to the carriage arm 9 by inserting the boss 23 into a hole 37 of the carriage arm 9 and by plastically deforming the boss 23 in the hole 37.

The boss 23 is formed separately from the plate 19, as mentioned above. The boss 23 is formed by, for example, pressing a stainless steel plate into a cylindrical shape. The boss 23 has a base 39 and a protrusion 41.

The base 39 has a support periphery 43 fixed to the plate 19. The support periphery 43 has a support face 45. The diameter of the support face 45 is slightly greater than the diameter of the protrusion 41, to form a step 47 between the base 39 and the protrusion 41. An end face of the base 39 serves as a contact face 51 to receive a jig 49.

The protrusion 41 has a fitting face 53. The fitting face 53 is pressed to the hole 37 of the carriage arm 9 when the protrusion 41 is plastically deformed. The protrusion 41 has a ball pass hole 55 opposite to the fitting face 53.

The plate 19 has a through hole 57 to hold the boss 23. The diameter of the through hole 57 is slightly smaller than the diameter of the support face 45 of the boss 23 to provide an overlap margin before assembling the boss 23 into the plate 19. The boss 23 is pressed into the through hole 57 of the plate 19 with the overlap margin. The overlap margin is, for example, 10 ì m. After the boss 23 is pressed into the through hole 57, the base 39 of the boss 23 is fixed to the plate 19 at weld spots 59 by, for example, laser welding.

The protrusion 41 of the boss 23 protrudes from a first face 61 of the plate 19. The base 39 of the boss 23 protrudes from a second face 63 of the plate 19. More precisely, the contact face 51 of the base 39 protrudes from the second face 63 of the plate 19. The boss 23 is formed separately from the plate 19, and therefore, the shape of the boss 23 is not restricted by the thickness of the plate 19. Consequently, the boss 23 is easily formed to make the contact face 51 protrude from the second face 63 of the plate 19. The step 47 of the boss 23 is flush with the first face 61 of the plate 19. The boss 23 may be formed to sink the step 47 from the first face 61.

The attachment of the boss 23 to the plate 19 and the attachment of the head suspension 11 to the carriage arm 9 will be explained.

To attach the boss 23 to the plate 19, the base 39 of the boss 23 is pressed into the through hole 57 of the plate 19 along the support face 45 of the boss 23. With the use of a jig, the height of the boss 23 relative to the plate 19 is fixed such that the contact face 51 of the boss 23 protrudes from the second face 63 of the plate 19 as shown in FIG. 5. The support face 45 is fixed to the through hole 57 by, for example, laser welding at the weld spots 59.

To attach the head suspension 11 to the carriage arm 9, the first face 61 of the plate 19 is made in contact with a fitting face 67 of the carriage arm 9. Under this state, the step 47 is flush with the first face 61 of the plate 19, and therefore, the step 47 and first face 61 are correctly made in contact with the fitting face 67.

At the same time, the protrusion 41 of the boss 23 is inserted into the hole 37 of the carriage arm 9. Under this state, the fitting face 53 has play relative to the hole 37.

The jig 49 is set on the contact face 51 to hold the boss 23 to the carriage arm 9. The jig 49 may have a comb shape to handle a plurality of the head suspensions shown in FIG. 1. The comb teeth of the jig 49 are inserted between the head suspensions, to support each boss 23 as shown in FIG. 5. Under this state, a steel ball is passed through the hole 55 in the direction of an arrow mark. When the ball is passed, the hole 55 is outwardly expanded to plastically deform the protrusion 41. This presses the fitting face 53 to the hole 37 of the carriage arm 9, to fix the plate 19 to the carriage arm 9.

When fitting the plate 19 to the carriage arm 9, the contact face 51 protrudes from the second face 63 of the plate 19, and therefore, reaction force from the jig 49 is surely applied to the base 39 of the boss 23. Consequently, the jig 49 can precisely position the boss 23 on the carriage arm 9.

Under the precisely positioned state of the boss 23 on the carriage arm 9, the protrusion 41 is plastically deformed, to correctly fix the boss 23 to the hole 37 of the carriage arm 9. This results in improving the attaching accuracy of the plate 19 to the carriage arm 9. The improved attaching accuracy realizes the precise positioning and excellent vibration characteristics of the slider 17. The boss 23 is correctly fitted into the hole 37 of the carriage arm 9, to improve the attaching strength of the plate 19 to the carriage arm 9.

The boss 23 is formed separately from the plate 19 from metal that is softer than metal to form the plate 19. As a result, the boss 23 is easily deformed and correctly fixed to the carriage arm 9.

The shape of the boss 23 is not restricted by the thickness of the plate 19, and therefore, the boss 23 may have a sufficient thickness to surely attach the boss 23 to the carriage arm 9.

There is no need of adjusting the thickness of the plate 19 by pressing, and therefore, the plate 19 may have a high flatness of several micrometers. In addition, the plate 19 may be made of hard metal to provide high hardness. This results in improving the attaching accuracy and strength of the plate 19 to the carriage arm 9.

The support face 45 of the boss 23 is pressed into the through hole 57 of the plate 19. Due to this, the boss 23 is correctly positioned in X and Y directions on the plate 19. This results in improving the attaching accuracy of the head suspension 11 to the carriage arm 9.

The rigid part 25 and resilient part 27 forming the load beam 21 of the head suspension 11 are separate parts, and therefore, can be made of proper materials and can have proper thicknesses, respectively. It is easy to simultaneously realize characteristics such as high rigidity required for the rigid part 25 and characteristics such as a low spring constant required for the resilient part 27. The resilient part 27 may be made of a precision rolled material to provide a stable low spring constant.

According to the embodiment, the support face 45 of the boss 23 directly joins with the contact face 51. Instead, a step like the step 47 may be formed between the support face 45 and the contact face 51.

Figure 6:
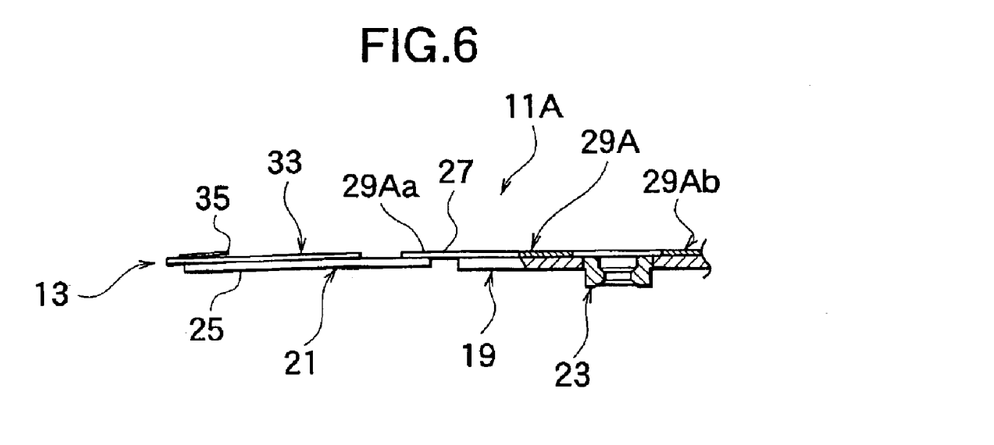
FIG. 6 is a partly broken side view showing a head suspension according to a modification of the first embodiment.
Figure 7:
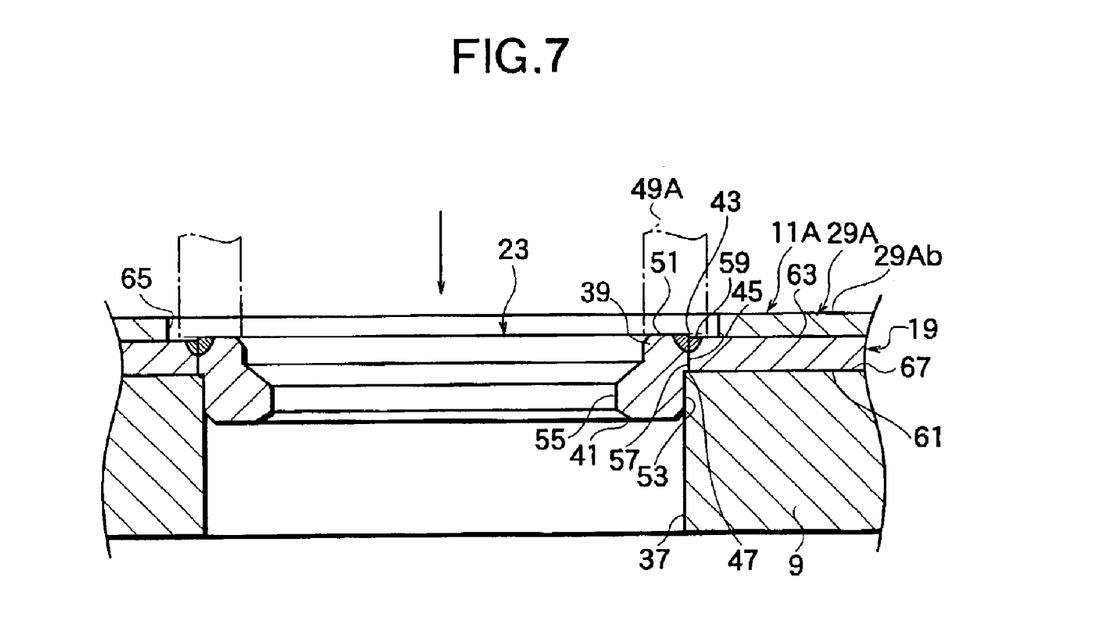
FIG. 7 is an enlarged sectional view showing a part of the head suspension of FIG. 6 to be attached to a carriage arm.

FIG. 6 is a partly broken side view showing a head suspension 11A according to a modification of the first embodiment, and FIG. 7 is an enlarged sectional view showing a part of the head suspension 11A to be attached to the carriage arm 9. In the modification and first embodiment, like parts are represented with like reference numerals.

The modification employs a resilient material 29A instead of the resilient material 29 of the first embodiment. The resilient material 29A forms a resilient part 27 serving as a hinge between a plate 19 and a rigid part 25. An end 29A*a* of the resilient material 29A is laid on an end of the rigid part 25 and is fixed thereto by, for example, welding (such as laser welding) or bonding. Another end 29A*b* of the resilient material 29A is laid over the plate 19 and is fixed thereto by, for example, welding (such as laser welding) or bonding.

The resilient material 29A has a through window 65 formed by, for example, etching or precision pressing. The window 65 is larger than a through hole 57 of the plate 19 and is outside weld spots 59 at which a boss 23 is fixed to the plate 19.

A jig 49A is set on a contact face 51 of the boss 23 to hold the boss 23 to the carriage arm 9. The modification provides the same effects as the first embodiment. In addition, the end 29A*b* of the resilient material 29A of the modification is extended over the plate 19 to entirely cover the plate 19 and is fixed thereto. This structure improves the attaching strength of the resilient material 29A to the plate 19.

(Second Embodiment)

Figure 8:
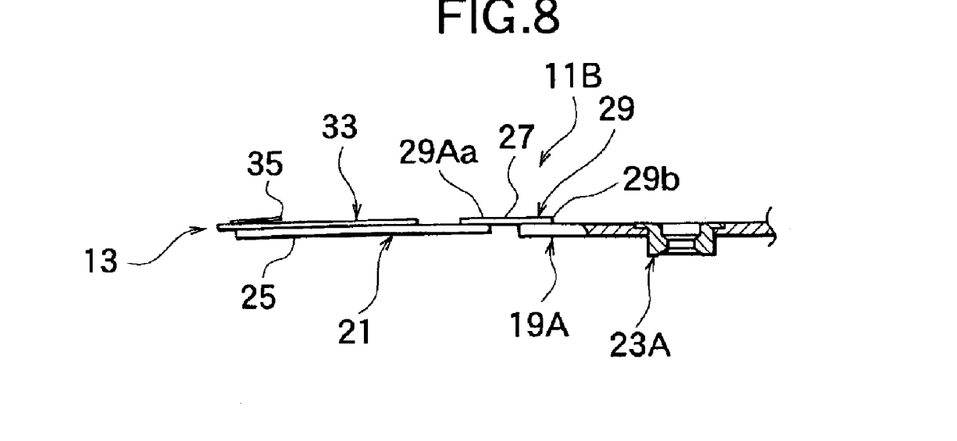
FIG. 8 is a partly broken side view showing a head suspension according to a second embodiment of the present invention.
Figure 9:
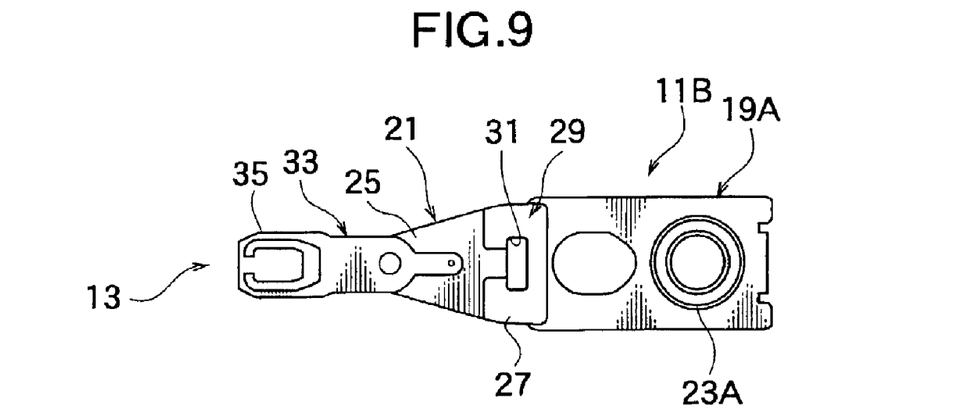
FIG. 9 is a plan view showing the head suspension of the second embodiment.
Figure 10:
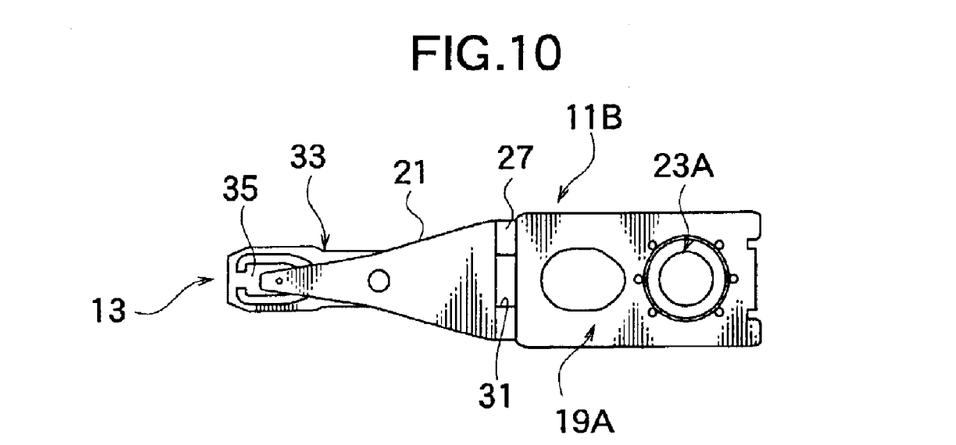
FIG. 10 is a bottom view showing the head suspension of the second embodiment.
Figure 11:
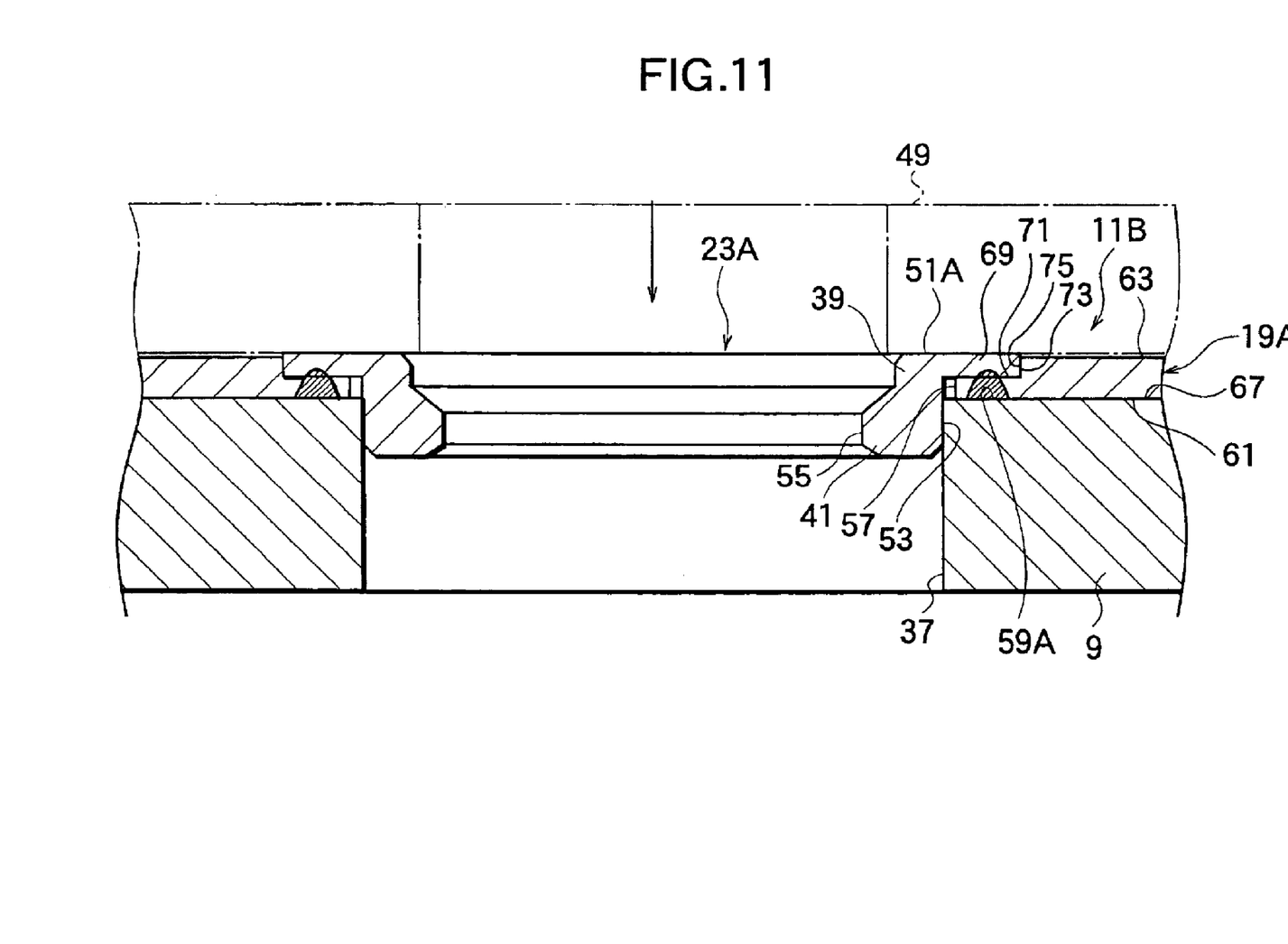
FIG. 11 is an enlarged sectional view showing a part of the head suspension of the second embodiment to be attached to a carriage arm.

A head suspension for a disk drive according to the second embodiment of the present invention will be explained with reference to FIGS. 8 to 11 in which FIG. 8 is a partly broken side view showing the head suspension 11B, FIG. 9 is a plan view showing the same, FIG. 10 is a bottom view showing the same, and FIG. 11 is an enlarged sectional view showing a part of the head suspension 11B to be attached to the carriage arm 9 (FIG. 1). The structure of the second embodiment is basically the same as that of the first embodiment, and therefore, like parts are represented with like reference numerals.

A boss 23A has a base 39 provided with a flange 69. The flange 69 protrudes in a radial direction by, for example, about 300 ì m. The thickness of a plate 19A is, for example, about 200 ì m.

The plate 19A has a through hole 57 around which a circumferential recess 71 is formed by, for example, half-etching. The recess 71 is open to a second face 63 of the plate 19A. There is a slight gap between a circumferential face 73 of the flange 69 and a circumferential face 75 of the recess 71.

The flange 69 is set in the recess 71 and is fixed to the plate 19A at weld spots 59A by laser welding. Under this state, a contact face 51A of the boss 23A protrudes from the second face 63 of the plate 19A.

The second embodiment is capable of surely applying reaction force from the jig 49 to the boss 23A, to provide the same effects as the first embodiment.

The second embodiment fits the flange 69 of the boss 23A into the recess 71 of the plate 19A, to suppress the total thickness and weight of the head suspension 11B and make the head suspension 11B compact.

Figure 12:
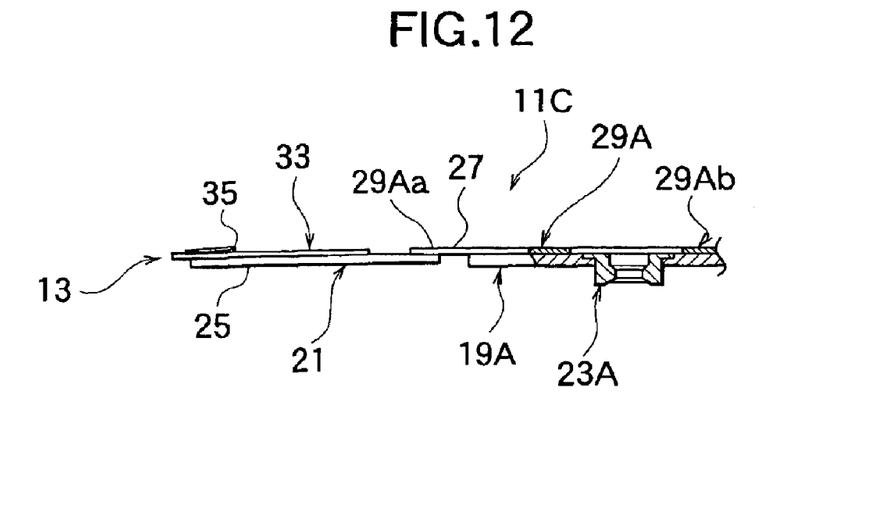
FIG. 12 is a partly broken side view showing a head suspension according to a modification of the second embodiment.
Figure 13:
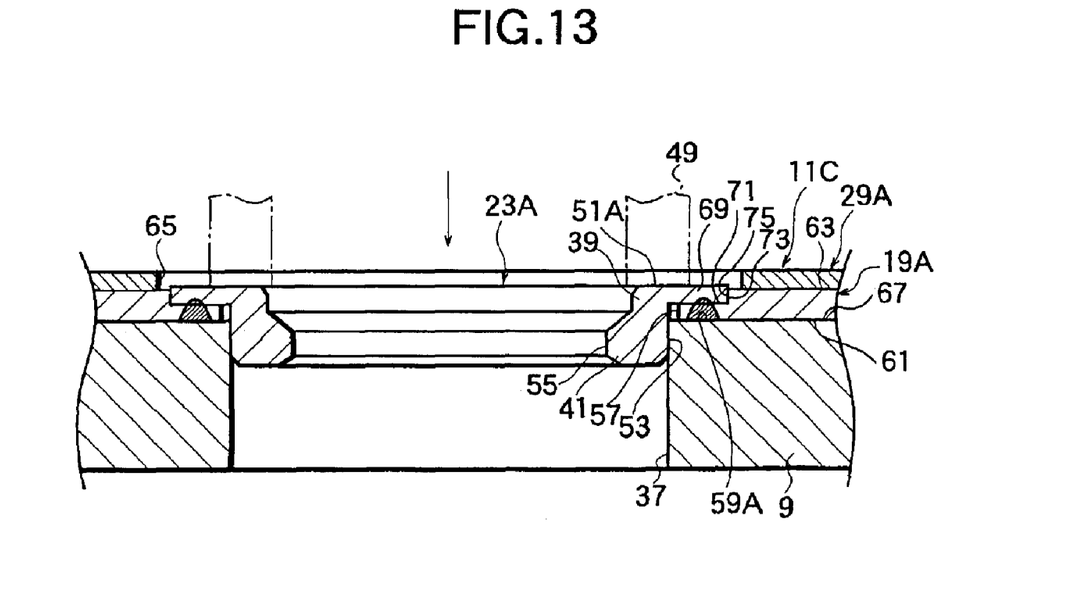
FIG. 13 is an enlarged sectional view showing a part of the head suspension of FIG. 12 to be attached to a carriage arm.

FIG. 12 is a partly broken side view showing a head suspension 11C according to a modification of the second embodiment and FIG. 13 is an enlarged sectional view showing a part of the head suspension 11C to be attached to the carriage arm 9. In the modification and second embodiment, like parts are represented with like reference numerals.

The modification employs a resilient material 29A instead of a resilient material 29 of the second embodiment. The resilient material 29A forms a resilient part 27 serving as a hinge between a plate 19A and a rigid part 25. An end 29A*a* of the resilient material 29A is laid on an end of the rigid part 25 and is fixed thereto by, for example, welding (such as laser welding) or bonding. Another end 29A*b* of the resilient material 29A is laid over the plate 19A and is fixed thereto by, for example, welding (such as laser welding) or bonding.

A jig 49A is set on a contact face 51A to hold a boss 23A to the carriage arm 9. The modification provides the same effects as the second embodiment. In addition, the end 29Ab of the resilient material 29A of the modification is extended over the plate 19A to entirely cover the plate 19A and is fixed thereto. This structure improves the attaching strength of the resilient material 29A to the plate 19A.

Figure 14:
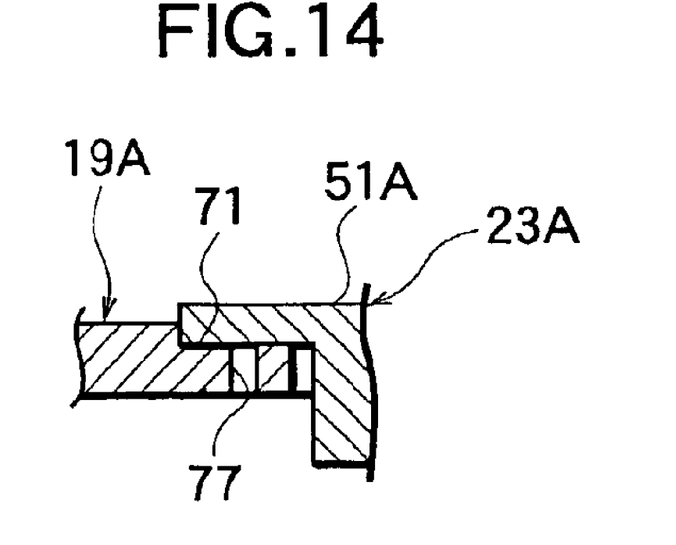
FIGS. 14 and 15 are enlarged sectional views showing a welding hole formed in the head suspension of the second embodiment.
Figure 15:
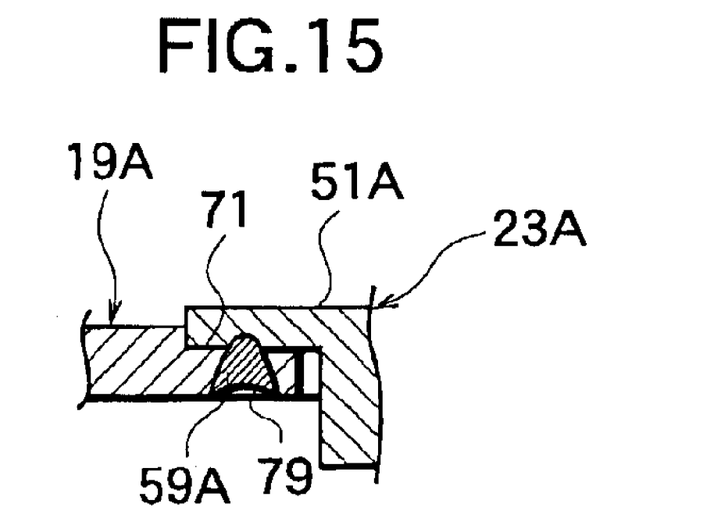

FIGS. 14 and 15 show an example of a weld spot 59A. In FIG. 14, the plate 19A at the recess 71 is provided with small holes 77 each of about ⌀0.15. In FIG. 15, laser welding is carried out in each small hole 77 to form the weld spot 59A. As a result, a surface 79 of the weld spot 59A slightly sinks. Namely, there is a gap between the surface 79 of the weld spot 59A and the fitting face 67 of the carriage arm 9, to improve the attaching accuracy of the plate 19A to the fitting face 67.

The laser welding to form the weld spots 59A may be carried out from the plate 19A or from the flange 69.

(Third Embodiment)

Figure 16:
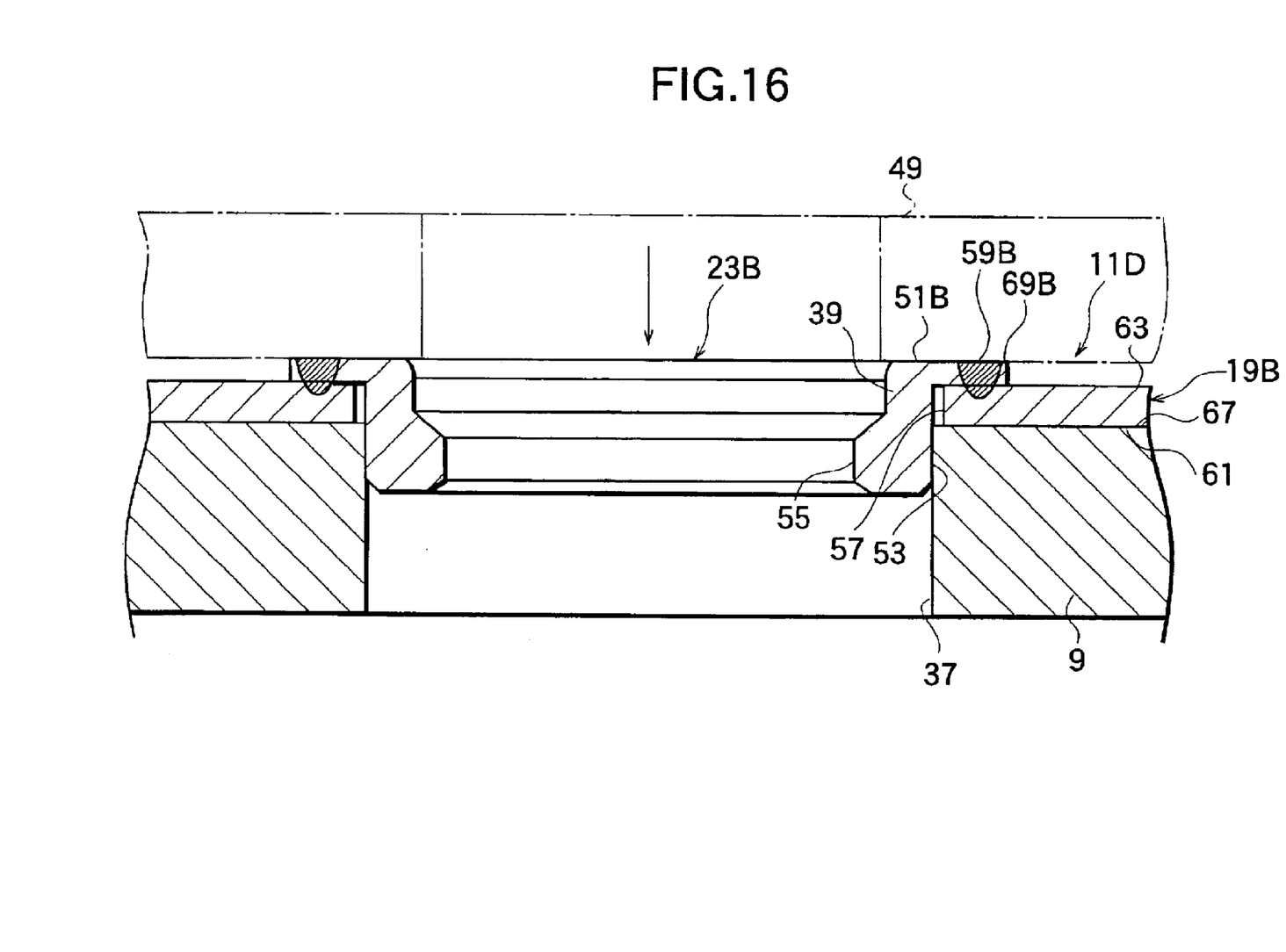
FIG. 16 is an enlarged sectional view showing a part of a head suspension to be attached to a carriage arm, according to a third embodiment of the present invention.

FIG. 16 is an enlarged sectional view showing a part of a head suspension 11D according to the third embodiment of the present invention, to be attached to the carriage arm 9. The structure of the third embodiment is basically the same as that of the first embodiment, and therefore, like parts are represented with like reference numerals.

A boss 23B has a base 39 provided with a flange 69B. There is a gap between the boss 23B and a plate 19B when they are assembled together.

The flange 69B of the boss 23B is set on a second face 63 of the plate 19B and is fixed thereto at weld spots 59B by laser welding. The laser welding to form the weld spots 59B may be carried out from the flange 69B or from the plate 19B. The head suspension 11D of the third embodiment employs a resilient material 29 that is the same as the resilient material 29 of any one of the first and second embodiments.

The third embodiment provides the same effects as the second embodiment. In addition, the third embodiment carries out no half-etching on the plate 19B, and therefore, realizes easy manufacturing. The thickness of the flange 69B may be equalized with that of the resilient material 29, to suppress the total thickness of the head suspension 11D.

Figure 17:
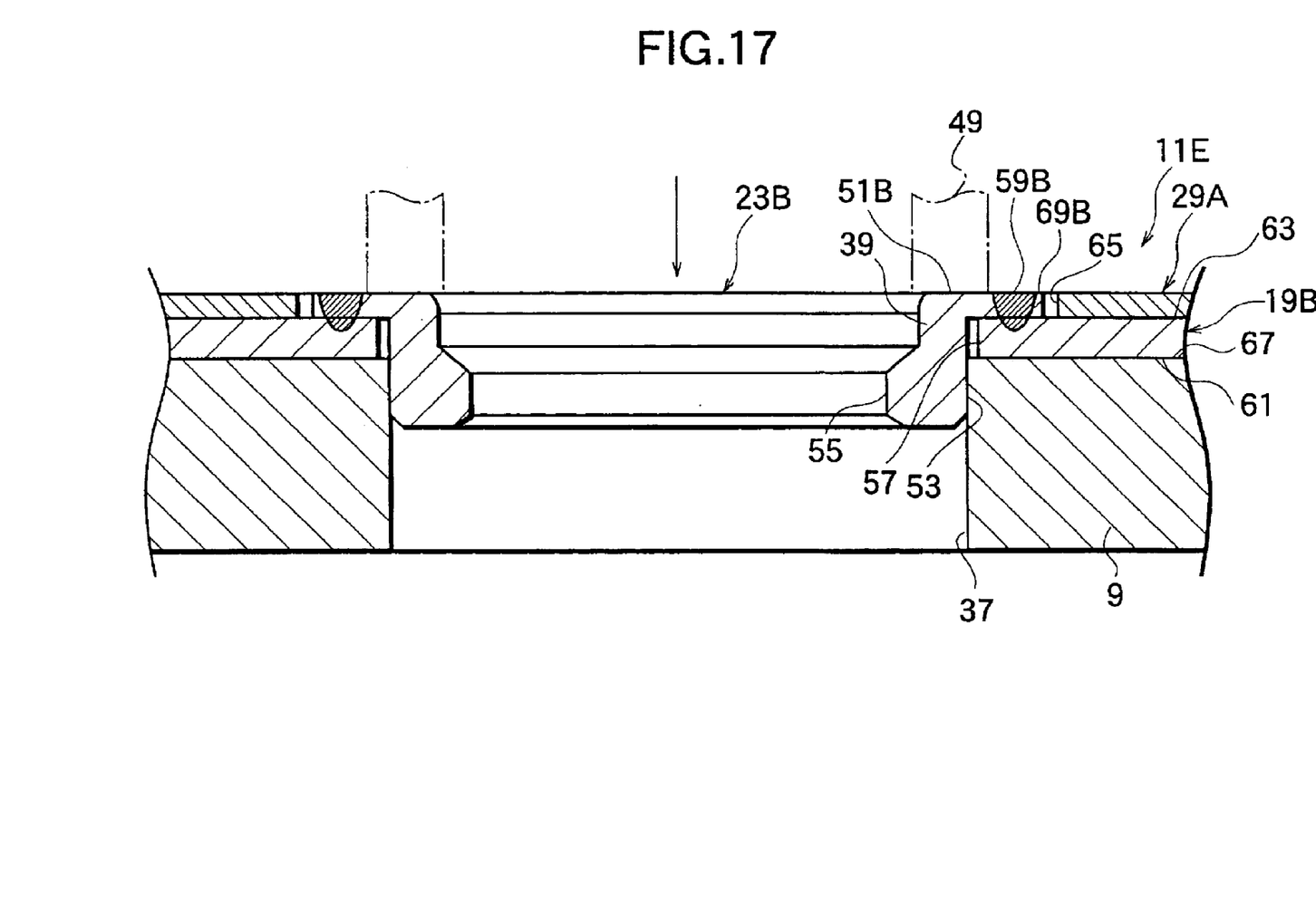
FIG. 17 is an enlarged sectional view showing a part of a head suspension to be attached to a carriage arm, according to a modification of the third embodiment.

FIG. 17 is an enlarged sectional view showing a part of a head suspension 11E according to a modification of the third embodiment, to be attached to the carriage arm 9. In the modification and third embodiment, like parts are represented with like reference numerals.

The modification employs a resilient material 29A instead of the resilient material 29 of the third embodiment. The resilient material 29A is laid over a plate 19B and is fixed thereto by, for example, welding (such as laser welding) or bonding.

A jig 49A is set on a contact face 51B to hold a boss 23B to the carriage arm 9. The modification provides the same effects as the third embodiment. In addition, the resilient material 29A of the modification is extended over the plate 19B to entirely cover the plate 19B and is fixed thereto. This structure improves the attaching strength of the resilient material 29A to the plate 19.

(Fourth Embodiment)

Figure 18:
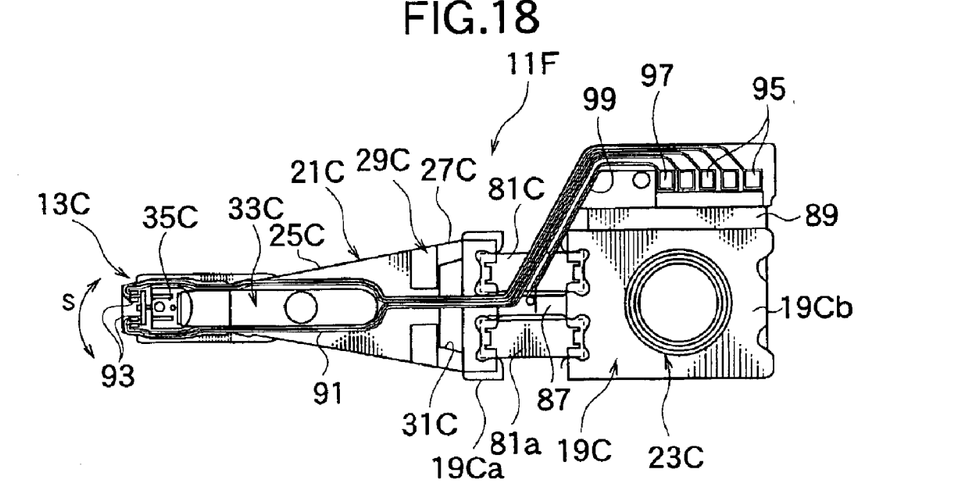
FIG. 18 is a plan view showing a head suspension according to a fourth embodiment of the present invention.
Figure 19:
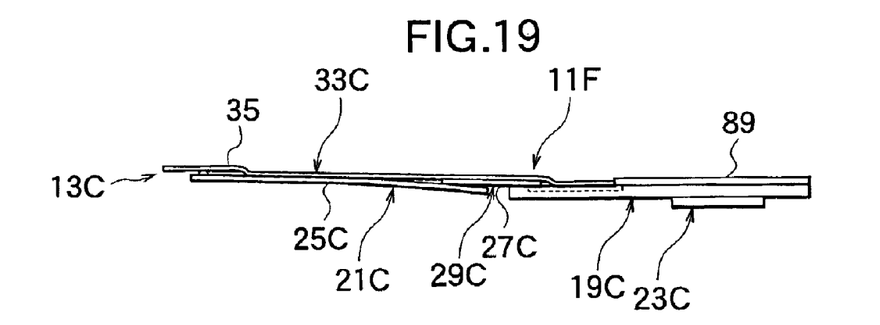
FIG. 19 is a side view showing the head suspension of the fourth embodiment.
Figure 20:
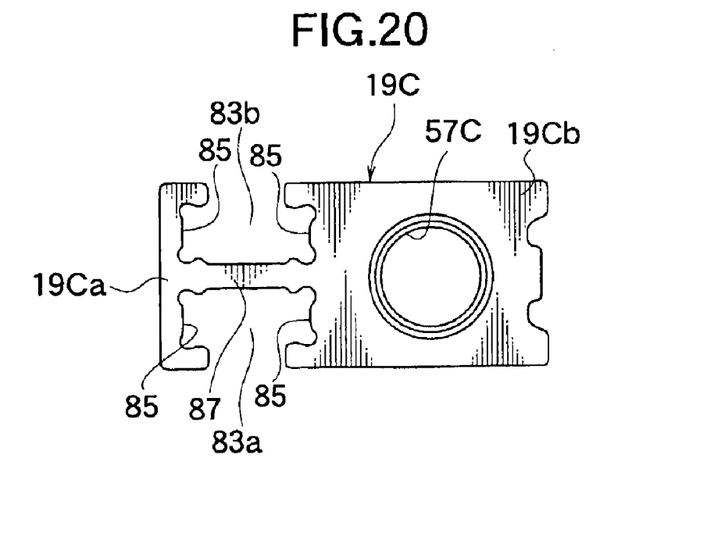
FIG. 20 is a plan view showing a plate of the head suspension of the fourth embodiment.

FIG. 18 is a plan view showing a head suspension 11F according to the fourth embodiment of the present invention, FIG. 19 is a side view showing the same, and FIG. 20 is a plan view showing a plate 19C of the head suspension 11F. The first to third embodiments employ a single actuator method employing only the positioning motor 7 (FIG. 1) to drive the head suspension (11, 11A, 11B). The fourth embodiment employs, in addition to the positioning motor 7, a second actuator, i.e., an actuator element such as a piezoelectric element to realize a dual actuator method.

The head suspension 11F has the plate 19C, a load beam 21C, and actuator elements 81*a* and 81*b*, which are, for example, piezoelectric elements.

The plate 19C has a through hole 57C and element receivers 83*a* and 83*b*. Each of the element receivers 83*a* and 83*b* has an element holder 85.

The through hole 57C receives a boss 23C, which is fixed to the plate 19C. Relationships between the plate 19C and the boss 23C and the structure of the boss 23C may be the same as those of the first to third embodiments.

A displacement part 87 is formed between the element receivers 83*a* and 83*b*, to displace a slider 17 independently of the carriage 5. The displacement part 87 deforms to sway a front end 19C*a* of the plate 19C relative to a base 19C*b* thereof in the direction of an arrow S of FIG. 18. Namely, the displacement part 87 is capable of displacing a front end of the load beam 21C relative to the plate 19C independently of the carriage 5.

A reinforcing plate 89 is fixed to the base 19Cb of the plate 19C by welding (such as laser welding) or bonding. The load beam 21C consists of a rigid part 25C and a resilient part 27C. The resilient part 27C is made of a resilient material 29C that is independent of the rigid part 25C. The resilient material 29C has an opening 31C formed by, for example, etching or precision pressing.

An end of the resilient material 29C is laid on a base end of the rigid part 25C and fixed thereto by welding (such as laser welding) or bonding. Another end of the resilient material 29C is laid on and fixed to the front end 19C*a* of the plate 19C by welding (such as laser welding) or bonding.

The rigid part 25C is provided with a flexure 33C having a conductive path 91. An end of the conductive path 91 is connected to a terminal 93 of a head 13C, and the other end thereof is connected to a terminal 95 arranged on the reinforcing plate 89. The reinforcing plate 89 also has a terminal 97 for the actuator elements 81a and 81b. The terminal 97 is connected to a conductive path 99, which is connected to the actuator elements 81a and 81b.

The boss 23C is inserted into the hole 37 of the carriage arm 9 and is plastically deformed therein, to attach the plate 19C to the carriage arm 9. In this way, the fourth embodiment provides the same effects as the first to third embodiments.

In addition, the fourth embodiment activates the actuator elements 81a and 81b to extend, for example, the actuator element 81a and contract the actuator element 81b, to deform the displacement part 87 and sway the slider 17 of the head 13C in an upward direction along the arrow S of FIG. 18. Alternatively, the actuator element 81a is contracted and the actuator element 81b is extended to displace the slider 17 of the head 13C in a downward direction along the arrow S of FIG. 18.

The driving system involving the actuator elements 81a and 81b is light compared with the driving system involving the motor 7, and therefore, is capable of controlling the slider 17 in high frequency bands. Accordingly, the fourth embodiment can increase a servo band width to control the position of the slider 17 several times higher than that in the driving system involving the motor 7. This results in reducing tracking errors.

With the improved attaching accuracy and strength of the plate 19C to the carriage arm 9, the fourth embodiment makes the actuator elements 81a and 81b fully demonstrate their performance.

In the head suspension 11F of the dual actuator method, the rigid part 25C and resilient part 27C may be integrated into one.

What is claimed is:

1. A head suspension for a disk drive having a contact face to receive a jig, comprising:

a plate to be attached to a carriage of the disk drive by inserting a boss of the plate into a hole of the carriage and by plastically deforming the inserted boss; and a load beam having a rigid part and a resilient part and supported by the plate, to apply load on a slider arranged at a front end of the load beam, the boss being formed separately from the plate and having a base fixed to the plate and a protrusion to be inserted into the hole of the carriage, the plate having a through hole to receive the boss, the boss being arranged in the through hole of the plate with the base of the boss fixed to the plate, the protrusion of the boss protruding from a first face of the plate, the base of the boss protruding from a second face of the plate, an end face of the base of the boss serving as a contact face to receive a jig, and the first face and the second face being parallel to each other.

2. The head suspension of claim 1, wherein:

the base of the boss is provided with a support periphery along the circumference of the base, the support periphery being inserted into the through hole of the plate to fix the boss to the plate.

3. The head suspension of claim 2, wherein:

the rigid part and resilient part of the load beam are formed separately from each other, a first end of the resilient part being joined to the rigid part and a second end of the resilient part being joined to the plate.

4. The head suspension of claim 1, wherein:

the base of the boss is provided with a flange along the circumference of the base, the flange being attached to the second face of the plate to fix the boss to the plate.

5. The head suspension of claim 4; wherein:

the rigid part and resilient part of the load beam are formed separately from each other, a first end of the resilient part being joined to the rigid part and a second end of the resilient part being joined to the plate.

6. The head suspension of claim 1, wherein:

the rigid part and resilient part of the load beam are formed separately from each other, a first end of the resilient part being joined to the rigid part and a second end of the resilient part being joined to the plate.

7. A head suspension for a disk drive having a contact face to receive a jig, comprising:

a plate to be attached to a carriage of the disk drive by inserting a boss of the plate into a hole of the carriage and by plastically deforming the inserted boss; and a load beam having a rigid part and a resilient part and supported by the plate, to apply load on a slider arranged at a front end of the load beam, the boss being formed separately from the plate and having a base fixed to the plate and a protrusion to be inserted into the hole of the carriage, the plate having a through hole to receive the boss, the boss being arranged in the through hole of the plate with the base of the boss fixed to the plate, the protrusion of the boss protruding from a first face of the plate, the base of the boss protruding from a second face of the plate, an end face of the base of the boss serving as a contact face to receive a jig, wherein:

the base of the boss is provided with a flange along the circumference of the base;

the plate is provided with a recess along the periphery of the through hole of the plate, the recess being open to the second face of the plate; and the flange is fitted into the recess to fix the boss to the plate.

8. The head suspension of claim 7, wherein:

the rigid part and resilient part of the load beam are formed separately from each other, a first end of the resilient part being joined to the rigid part and a second end of the resilient part being joined to the plate.

9. A head suspension for a disk drive having a contact face to receive a jig, comprising:

a plate to be attached to a carriage of the disk drive by inserting a boss of the plate into a hole of the carriage and by plastically deforming the inserted boss; and a load beam having a rigid part and a resilient part and supported by the plate, to apply load on a slider arranged at a front end of the load beam, the boss being formed separately from the plate and having a base fixed to the plate and a protrusion to be inserted into the hole of the carriage, the plate having a through hole to receive the boss, the boss being arranged in the through hole of the plate with the base of the boss fixed to the plate, the protrusion of the boss protruding from a first face of the plate, the base of the boss protruding from a second face of the plate, an end face of the base of the boss serving as a contact face to receive a jig, further comprising:

a displacement part to displace the front end of the load beam relative to the plate independently of a displacement achieved by the carriage; and an actuator element to actuate the displacement part.

10. The head suspension of claim 9, wherein:

the base of the boss is provided with a support periphery along the circumference of the base, the support periphery being inserted into the through hole of the plate to fix the boss to the plate.

11. The head suspension of claim 10, wherein:

the rigid part and resilient part of the load beam are formed separately from each other, a first end of the resilient part being joined to the rigid part and a second end of the resilient part being joined to the plate.

12. The head suspension of claim 9, wherein:

the base of the boss is provided with a flange along the circumference of the base;

the plate is provided with a recess along the perinhery of the through hole of the plate, the recess being oven to the second face of the plate; and the flange is fitted into the recess to fix the boss to the plate.

13. The head suspension of claim 12, wherein:

the rigid part and resilient part of the load beam are formed separately from each other, a first end of the resilient part being joined to the rigid part and a second end of the resilient part being joined to the plate.

14. The head suspension of claim 9, wherein:

the base of the boss is provided with a flange along the circumference of the base, the flange being attached to the second face of the plate to fix the boss to the plate.

15. The head suspension of claim 14, wherein:

the rigid part and resilient cart of the load beam are formed separately from each other, a first end of the resilient nart being joined to the rigid part and a second end of the resilient nart being joined to the plate.

16. The head suspension of claim 9, wherein:

the rigid part and resilient part of the load beam are formed separately from each other, a first end of the resilient part being joined to the rigid part and a second end of the resilient part being joined to the plate.

* * * * *